Aug. 2, 1932.  A. H. OELKERS  1,870,136
WHEEL AND AXLE ASSEMBLY
Filed July 5, 1928
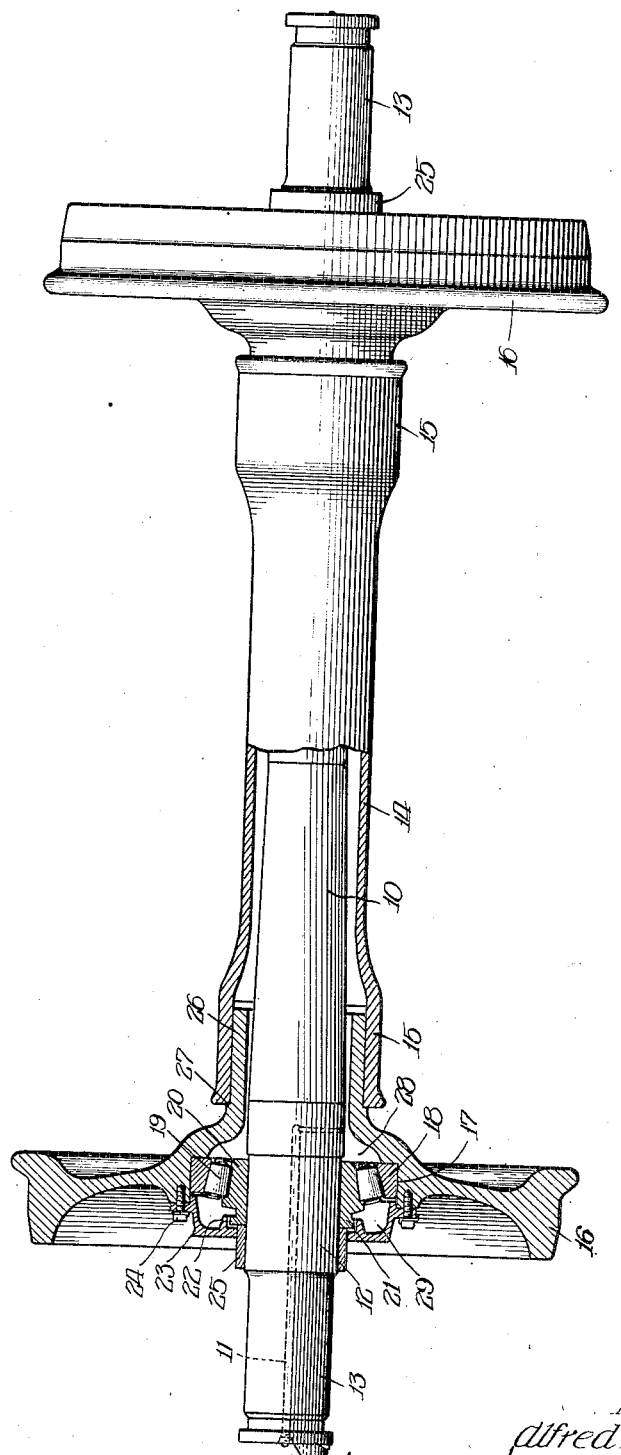

Patented Aug. 2, 1932

1,870,136

UNITED STATES PATENT OFFICE

ALFRED H. OELKERS, OF CHICAGO, ILLINOIS, ASSIGNOR TO AMERICAN STEEL FOUNDRIES, OF CHICAGO, ILLINOIS, A CORPORATION OF NEW JERSEY

WHEEL AND AXLE ASSEMBLY

Application filed July 5, 1928. Serial No. 290,350.

This invention pertains to a wheel and axle assembly, and more particularly to a roller bearing wheel and axle assembly for railway rolling stock.

It is an object of this invention to provide an assembly of light construction and one which overcomes operating, manufacturing and assemblage difficulties heretofore encountered in the service of combined wheel and axle construction.

Another object is to provide a construction which is of simple form, making it possible to produce various parts of the assemblage by a forging process instead of producing these parts by the usual casting process.

Still another object of the invention is to provide a construction wherein a simple support is provided for the outer race rings of the roller bearing within the wheel proper, making it possible to provide a bearing recess which will not be affected by the press fit of the wheel in the housing.

A further object of the invention is to provide an assembly providing a convenient and secure support for roller bearings which are adapted to receive both the radial load and the end thrusts through the form of the roller used.

Still further object is to provide a roller bearing wheel and axle assembly which is efficient, inexpensive to make and maintain and fulfills all requirements of service and manufacture, and one which may be so constructed as to be readily interchangeable with the standard A. R. A. wheel and axle assembly.

With these and various other objects in view, the invention may consist of certain novel features of construction and operation as will be more fully described and particularly pointed out in the specification, drawing and claims appended hereto.

In the drawing, which illustrates an embodiment of the device, and wherein like reference characters are used to designate like parts—

The figure is an elevation, partly in section, of a roller bearing wheel and axle assembly including the invention.

The assembly consists essentially of an inner axle 10 having means 11 for introducing lubricant from the outer end of the axle to the bearings, the axle preferably being of reduced diameter adjacent the center thereof, all in accordance with recognized practice. The axle is also provided with a cylindrical bearing receiving portion 12 and reduced end portions 13 adapted to cooperate with the brasses and be retained in the journal boxes, all as particularly described in applicant's application Serial No. 182,734, filed April 11, 1927, for Anti-Friction Wheel and Axle Construction. An outer axle or housing 14 is provided encasing a substantial portion of the inner axle 11, said axle being provided with enlarged end portions 15, the housing being preferably of such size as to provide a substantial space between the outer and inner axles.

Wheels 16 are provided having an innei bore 17 adapted to receive the outer race ring 18, as by a press fit, of the roller bearing assembly 19, which assembly may be of any desired construction, such as of the Timken or Schaefer type. In the construction shown, the rollers are so disposed that the axes thereof intersect the center line of the inner axle and consequently the assembly at a point determined by the lateral clearance to be taken up. Inner race ring 20 of the bearing assembly is secured as by press fit to the cylindrical portion 12 of the inner axle, said race ring being provided with an extended portion 21 adapted to cooperate with inwardly projecting portion 22 of a cover plate 23 secured as by bolts 24 to the wheel 16, said cover extending to a point adjacent the securing ring 25 shrunk or press fitted to the cylindrical portion 12 of the inner axle for maintaining the roller bearing assembly 19 in operative position.

In this construction, the bearing assembly 19 is so located and the wheel is so proportioned that the load is preferably transmitted to the rail through a vertical plane passing through the rail and the roller bearing assembly. This is accomplished by locating the roller bearings within the planes through the inner and outer faces of the wheels, that is, locating the planes as defining the outer face of the flange and the outer face of the tread.

The wheel 16 is provided with an inwardly projecting hub 26 adapted to have a press fit with the outer housing 14 or to have said housing shrunk thereon, shoulders 27 being provided in order to correctly space the wheels 26. Said wheels are also so proportioned that a generous lubricant recess 28 is provided on the inside of said rollers and the cover plates are so proportioned that a generous lubricant recess 29 is provided outwardly of the bearing assembly.

It will be appreciated then that with the assembly shown, the two separate wheels can be rigidly mounted on the housing to thereby form a complete unit, and as the bearings are mounted directly within the recess provided in the wheels, the diameter of which recess is constant, no variation need be made in said bearing assemblies permitting ready assembling or replacing of parts.

It is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

I claim:

1. In a wheel and axle assembly the combination of wheels having hub portions, and an axle having portions into which said hub portions are disposed and secured.

2. In a wheel and axle assembly the combination of wheel members, and an axle member, said wheel members each having a portion fitting within a portion of said axle member and secured thereto.

3. In a wheel and axle assembly the combination of a pair of axles, wheels cooperating therewith, said wheels having hub portions mounted within one of said axles to move therewith, and bearings between said wheels and one of said axles.

4. In a wheel and axle assembly the combination of a pair of axles, wheels cooperating therewith, said wheels having hub portions mounted within one of said axles to move therewith, and bearings between said wheels and the other of said axles.

5. In a wheel and axle assembly the combination of wheels having hub portions having shoulders thereon, and an axle having a portion engaging said hub portions and on the outside thereof adapted to be positioned by said shoulders.

6. In a wheel and axle assembly the combination of wheels having bearing recesses therein, and hub portions formed thereon and forming lubricant recesses adjacent said bearing recesses, and an axle disposed between and engaging on said hub portions.

7. In a wheel and axle assembly the combination of inner and outer concentric axles, a wheel having a hub portion engaging within one of said axles, and anti-friction bearings disposed between the wheel and said other axle.

8. In a wheel and axle assembly the combination of inner and outer concentric axles, a wheel having a hub portion having a press fit within the outer of said axles, and anti-friction bearings disposed between the wheel and said other axle.

9. In a wheel and axle assembly the combination of inner and outer concentric axles, a wheel having a hub portion having a press fit within the outer of said axles, and anti-friction bearings disposed between the wheel and said other axle and located wholly within the planes through the inner and outer faces of said wheel and normal to the axes of said axles, said anti-friction bearings being disposed to themselves take the vertical load and end thrust incident to the operation of said assembly.

10. In a wheel and axle assembly the combination of inner and outer concentric axles, a wheel having a hub portion having a press fit in one of said axles, and anti-friction bearings disposed between the wheel and said other axle.

11. In a wheel and axle assembly the combination of inner and outer concentric spaced axles, a wheel having a hub portion engaging within one of said axles, and anti-friction bearings disposed between the wheel and said other axle.

12. In a wheel and axle assembly the combination of inner and outer concentric spaced axles, a wheel having a hub portion having a press fit in one of said axles, and anti-friction bearings disposed between the wheel and said other axle.

13. In a wheel and axle assembly the combination of inner and outer concentric spaced axles, a wheel having a hub portion having a press fit in one of said axles, and anti-friction bearings disposed between the wheel and said other axle and located within the planes through the inner and outer faces of said wheel and normal to the axes of said axles.

14. In a wheel and axle assembly the combination of inner and outer concentric spaced axles, a wheel having a hub portion having a press fit in one of said axles, anti-friction bearings disposed between the wheel and said other axle and located within the planes through the inner and outer faces of said wheel and normal to the axes of said axles, and a cover plate disposed between said wheel and one of said axles, said cover plate and wheel forming a lubricant recess for said bearings.

15. In a wheel and axle assembly the combination of inner and outer concentric spaced axles, the outer axle having enlarged end portions, wheels having hub portions having a press fit in said end portions, and anti-friction bearings disposed between said wheels and said inner axle.

16. In a wheel and axle assembly the combination of inner and outer concentric spaced axles, the outer axle having enlarged end portions, wheels having hub portions having a press fit in said end portions, and anti-friction bearings disposed between said wheels and said inner axle and located substantially in a vertical plane through the rail engaging portions of said wheels.

17. In a wheel and axle assembly the combination of inner and outer concentric spaced axles, the outer axle having enlarged end portions, wheels having hub portions having a press fit in said end portions, anti-friction bearings disposed between said wheels and said inner axle and located substantially in a vertical plane through the rail engaging portions of said wheels, and cover plates carried by said wheels and extending between said wheels and inner axle and forming lubricant recesses for said bearings with said wheels.

18. In a wheel and axle assembly the combination of wheels having hub portions, and a forged axle having a portion engaging the outside of said hub portions.

19. In a wheel and axle assembly the combination of a pair of axles, one of said axles being disposed at least partially within the other of said axles, and wheel members having portions fitting between and secured to the outer of said axles.

20. In a wheel and axle assembly the combination of a pair of axles, wheels cooperating therewith, said wheels having hub portions mounted within one of said axles, and bearings between said wheels and one of said axles.

21. In a wheel and axle assembly the combination of a pair of axles, wheels cooperating therewith, said wheels having hub portions mounted within one of said axles, and bearings between said wheels and the inner of said axles.

Signed at Chicago, Illinois, this 2nd day of July, 1928.

ALFRED H. OELKERS.